(12) United States Patent
Weinzaepfel et al.

(10) Patent No.: US 12,164,559 B2
(45) Date of Patent: Dec. 10, 2024

(54) SYSTEMS AND METHODS FOR IMAGE RETRIEVAL USING SUPER FEATURES

(71) Applicant: NAVER CORPORATION, Gyeonggi-do (KR)

(72) Inventors: Philippe Weinzaepfel, Montbonnot-Saint-Martin (FR); Thomas Lucas, Grenoble (FR); Diane Larlus, La Tronche (FR); Ioannis Kalantidis, Grenoble (FR)

(73) Assignee: NAVER CORPORATION, Gyeonggi-do (KR)

( * ) Notice: Subject to any disclaimer, the term of this patent is extended or adjusted under 35 U.S.C. 154(b) by 320 days.

(21) Appl. No.: 17/581,158

(22) Filed: Jan. 21, 2022

(65) Prior Publication Data
US 2023/0107921 A1    Apr. 6, 2023

Related U.S. Application Data

(60) Provisional application No. 63/252,223, filed on Oct. 5, 2021.

(51) Int. Cl.
  *G06K 9/00*    (2022.01)
  *G06F 16/583*  (2019.01)
  (Continued)

(52) U.S. Cl.
  CPC ............. *G06F 16/583* (2019.01); *G06N 3/08* (2013.01); *G06T 7/73* (2017.01); *G06T 2207/20081* (2013.01); *G06T 2207/20084* (2013.01)

(58) Field of Classification Search
  CPC ....... G06T 7/0014; G06T 7/0016; G06T 7/73; G06T 7/74; G06T 7/75;
  (Continued)

(56) References Cited

U.S. PATENT DOCUMENTS 10,699,129 B1 *   6/2020  Jiang .................... G06V 10/454
12,033,081 B2 *   7/2024  Sarlin ................... G06V 20/36
(Continued)

OTHER PUBLICATIONS

H. Lin, Y. Song, Z. Zeng, W. Wang and J. Wang, "Aggregating Object Features Based on Attention Weights for Fine-Grained Image Retrieval," 2020 25th International Conference on Pattern Recognition (ICPR), Milan, Italy, 2021, pp. 2838-2844 (Year: 2020).*

(Continued)

*Primary Examiner* — Atiba O Fitzpatrick

(57) ABSTRACT

Am image retrieval system includes: a neural network (NN) module configured to generate local features based on an input image; an iterative attention module configured to, via T iterations, generate an ordered set of super features in the input image based on the local features, where T is an integer greater than 1; and a selection module configured to select a second image from a plurality of images in an image database based on the second image having a second ordered set of super features that most closely match the ordered set of super features in the input image, where the super features in the set of super features do not include redundant local features of the input image.

28 Claims, 11 Drawing Sheets
(7 of 11 Drawing Sheet(s) Filed in Color)

(51) Int. Cl.
*G06N 3/08* (2023.01)
*G06T 7/73* (2017.01)

(58) Field of Classification Search
CPC ........... G06T 2207/20081; G06T 2207/20084; G06V 40/167; G06V 10/454; G06V 30/18; G06V 30/1801; G06V 30/18133; G06V 30/18143; G06V 10/70; G06V 10/82; G06V 10/774–7796; G16H 30/20; G16H 30/40; G16H 30/00; G06F 16/53; G06F 16/532; G06F 16/535; G06F 16/538; G06F 18/22; G06F 18/214–2155; G06F 7/023; G06F 40/16; G06Q 10/06; G06N 3/0464; G06N 3/02–126; G06N 20/00–20; G06K 9/6256; G06K 9/6257; G06K 9/6259
See application file for complete search history.

(56) References Cited

U.S. PATENT DOCUMENTS

| 2019/0139218 | A1* | 5/2019 | Song | G06N 3/044 |
|---|---|---|---|---|
| 2020/0242153 | A1* | 7/2020 | Luo | G06F 18/22 |
| 2020/0334490 | A1* | 10/2020 | Shen | G06N 3/08 |
| 2021/0150252 | A1* | 5/2021 | Sarlin | G06V 30/1988 |
| 2022/0058332 | A1* | 2/2022 | Ke | G06F 18/214 |
| 2024/0005701 | A1* | 1/2024 | Liu | G06V 10/764 |

OTHER PUBLICATIONS

Yunlong Yu, Zhong Ji, Yanwei Fu, "Stacked Semantic-Guided Attention Model for Fine-Grained Zero-Shot Learning", School of Electrical and Information Engineering, Tianjin University, School of Data Science, Fudan University, Computer Science Department, Binghamton University, pp. 4321-4329 (Year: 2018).*
S. Gkelios, Y. Boutalis and S. A. Chatzichristofis, "Investigating the Vision Transformer Model for Image Retrieval Tasks," 2021 17th International Conference on Distributed Computing in Sensor Systems (DCOSS), Pafos, Cyprus, 2021, pp. 367-373 (Year: 2021).*
Albert Gordo, Jon Almazán, Jerome Revaud, and Diane Larlus. Deep image retrieval: Learning global representations for image search. In Proc. ECCV, 2016.
Albert Gordo. Supervised mid-level features for word image representation. In Proc. CVPR, 2015.
Alexander Sax, Jeffrey O Zhang, Bradley Emi, Amir Zamir, Silvio Savarese, Leonidas Guibas, and Jitendra Malik. Learning to navigate using mid-level visual priors. arXiv preprint arXiv:1912.11121, 2019.
Andrew Brown, Weidi Xie, Vicky Kalogeiton, and Andrew Zisserman. Smooth-ap: Smoothing the path towards large-scale image retrieval. In ECCV, 2020.
Andrew Jaegle, Felix Gimeno, Andrew Brock, Andrew Zisserman, Oriol Vinyals, and Joao Carreira. Perceiver: General perception with iterative attention. 2021.
Anne M Treisman and Garry Gelade. A feature-integration theory of attention. Cognitive psychology, 12(1): 97-136, 1980.
Artem Babenko and Victor Lempitsky. Aggregating deep convolutional features for image retrieval. In Proc. ICCV, 2015.
Ashish Vaswani, Noam Shazeer, Niki Parmar, Jakob Uszkoreit, Llion Jones, Aidan N Gomez, Łukasz Kaiser, and Illia Polosukhin. Attention is all you need. In Proc. NeurIPS, 2017.
Basura Fernando, Elisa Fromont, and Tinne Tuytelaars. Mining mid-level features for image classification. IJCV, 108(3):186-203, 2014.
Bingyi Cao, André Araujo, and Jack Sim. Unifying deep local and global features for image search. In Proc. ECCV, 2020.
Bria Long, Chen-Ping Yu, and Talia Konkle. Mid-level visual features underlie the high-level categorical organization of the ventral stream. Proc. National Academy of Sciences, 115(38):E9015-E9024, 2018.

Carl Doersch, Saurabh Singh, Abhinav Gupta, Josef Sivic, and Alexei Efros. What makes Paris look like Paris? ACM Transactions on Graphics, 31(4), 2012.
Chull Hwan Song, Hye Joo Han, and Yannis Avrithis. All the attention you need: Global-local, spatial-channel attention for image retrieval. arXiv preprint arXiv:2107.08000, 2021.
David G Lowe. Distinctive image features from scale-invariant keypoints. IJCV, 60(2):91-110, 2004.
David Novotny, Samuel Albanie, Diane Larlus, and Andrea Vedaldi. Self-supervised learning of geometrically stable features through probabilistic introspection. In Proc. CVPR, 2018.
Dzmitry Bahdanau, Kyunghyun Cho, and Yoshua Bengio. Neural machine translation by jointly learning to align and translate. In Proc. ICLR, 2015.
Filip Radenovic, Giorgos Tolias, and Ondřej Chum. Fine-tuning cnn image retrieval with no human annotation. IEEE trans. PAMI, 2018.
Filip Radenovíc, Ahmet Iscen, Giorgos Tolias, Yannis Avrithis, and Ondřej Chum. Revisiting oxford and paris: Large-scale image retrieval benchmarking. In Proc. CVPR, 2018a.
Filip Radenovíc, Giorgos Tolias, and Ondřej Chum. Fine-tuning cnn image retrieval with no human annotation. IEEE Trans PAMI, 2018b.
Florent Perronnin, Yan Liu, Jorge Sánchez, and Hervé Poirier. Large-scale image retrieval with compressed fisher vectors. In Proc. CVPR, 2010.
Francesco Locatello, Dirk Weissenborn, Thomas Unterthiner, Aravindh Mahendran, Georg Heigold, Jakob Uszkoreit, Alexey Dosovitskiy, and Thomas Kipf. Object-centric learning with slot attention. In NeurIPS,2020.
Gabriella Csurka and Martin Humenberger. From handcrafted to deep local invariant features. arXiv preprint arXiv:1807.10254, 2:1, 2018.
Gabriella Csurka, Christopher Dance, Lixin Fan, Jutta Willamowski, and Cédric Bray. Visual categorization with bags of keypoints. In ECCV Workshop on statistical learning in computer vision, 2004.
Giorgos Tolias, Tomas Jenicek, and Ondřej Chum. Learning and aggregating deep local descriptors for instancelevel recognition. In Proc. ECCV, 2020.
Giorgos Tolias, Yannis Avrithis, and Hervé Jégou. To aggregate or not to aggregate: Selective match kernels for image search. In Proc. ICCV, 2013.
Grégoire Mialon, Dexiong Chen, Alexandre d'Aspremont, and Julien Mairal. A trainable optimal transport embedding for feature aggregation and its relationship to attention. In Proc. ICLR, 2021.
Hervé Jégou,Matthijs Douze, Cordelia Schmid, and Patrick P'erez. Aggregating local descriptors into a compact image representation. In Proc. CVPR, 2010.
Huaizu Jiang, Jingdong Wang, Zejian Yuan, Yang Wu, Nanning Zheng, and Shipeng Li. Salient object detection: A discriminative regional feature integration approach. In Proc. CVPR, Jun. 2013.
Hyeonwoo Noh, Andre Araujo, Jack Sim, Tobias Weyand, and Bohyung Han. Large-scale image retrieval with attentive deep local features. In ICCV, 2017.
James Philbin, Ondrej Chum, Michael Isard, Josef Sivic, and Andrew Zisserman. Lost in quantization: Improving particular object retrieval in large scale image databases. In Proc. CVPR, 2008.
James Philbin, Ondrej Chum, Michael Isard, Josef Sivic, and Andrew Zisserman. Object retrieval with large vocabularies and fast spatial matching. In Proc. CVPR, 2007.
Jean-Bastien Grill, Florian Strub, Florent Altché, Corentin Tallec, Kavukcuoglu Koray, Rémi Munos, and Michal Valko. Bootstrap your own latent: A new approach to self-supervised learning. In Proc. NeurIPS, 2020.
Jérome Revaud, Cesar De Souza, Martin Humenberger, and Philippe Weinzaepfel. R2D2: Reliable and repeatable detector and descriptor. In Proc. NeurIPS, 2019b.
Jérome Revaud, Jon Almazán, Rafael S Rezende, and Cesar Roberto de Souza. Learning with average precision: Training image retrieval with a listwise loss. In ICCV, 2019.

(56) References Cited

OTHER PUBLICATIONS

Jérome Revaud, Jon Almazán, Rafael S Rezende, and Cesar Roberto de Souza. Learning with average precision: Training image retrieval with a listwise loss. In Proc. ICCV, 2019a.

Josef Sivic and Andrew Zisserman. Video google: A text retrieval approach to object matching in videos. In Proc. ICCV, 2003.

Kai Chen, Lanqing Hong, Hang Xu, Zhenguo Li, and Dit-Yan Yeung. Multisiam: Self-supervised multiinstance siamese representation learning for autonomous driving. In Proc. ICCV, 2021.

Kaiming He, Xiangyu Zhang, Shaoqing Ren, and Jian Sun. Deep residual learning for image recognition. In Proc. CVPR, 2016.

Kihyuk Sohn, David Berthelot, Chun-Liang Li, Zizhao Zhang, Nicholas Carlini, Ekin D. Cubuk, Alex Kurakin, Han Zhang, and Colin Raffel. Fixmatch: Simplifying semi-supervised learning with consistency and confidence. Proc. NeurIPS, 2020.

Martin Humenberger, Yohann Cabon, Nicolas Guerin, Julien Morat, Jérome Revaud, Philippe Rerole, Noé Pion, Cesar de Souza, Vincent Leroy, and Gabriela Csurka. Robust image retrieval-based visual localization using kapture. arXiv preprint arXiv:2007.13867, 2020.

Marvin Teichmann, Andre Araujo, Menglong Zhu, and Jack Sim. Detect-to-retrieve: Efficient regional aggregation for image search. In Proc. CVPR, 2019.

Mathilde Caron, Hugo Touvron, Ishan Misra, Hervé Jegou, Julien Mairal, Piotr Bojanowski, and Armand Joulin. Emerging properties in self-supervised vision transformers. In Proc. ICCV, 2021.

Maxime Oquab, Leon Bottou, Ivan Laptev, and Josef Sivic. Learning and transferring mid-level image representations using convolutional neural networks. In Proc. CVPR, 2014.

Mayank Juneja, Andrea Vedaldi, C.V. Jawahar, and Andrew Zisserman. Blocks that shout: Distinctive parts for scene classification. In Proc. CVPR, Jun. 2013.

Min Yang, Dongliang He, Miao Fan, Baorong Shi, Xuetong Xue, Fu Li, Errui Ding, and Jizhou Huang. Dolg: Single-stage image retrieval with deep orthogonal fusion of local and global features. arXiv preprint arXiv:2108.02927, 2021.

Nicolas Carion, Francisco Massa, Gabriel Synnaeve, Nicolas Usunier, Alexander Kirillov, and Sergey Zagoruyko. End-to-end object detection with transformers. Proc. ECCV, 2020.

Paul-Edouard Sarlin, Cesar Cadena, Roland Siegwart, and Marcin Dymczyk. From coarse to fine: Robust hierarchical localization at large scale. In Proc. CVPR, 2019.

Qianqian Wang, Xiaowei Zhou, Bharath Hariharan, and Noah Snavely. Learning feature descriptors using camera pose supervision. In Proc. ECCV, 2020.

Qunjie Zhou, Torsten Sattler, and Laura Leal-Taixe. Patch2pix: Epipolar-guided pixel-level correspondences. In Proc. CVPR, 2021.

Saurabh Singh, Abhinav Gupta, and Alexei A Efros. Unsupervised discovery of mid-level discriminative patches. In Proc. ECCV, 2012.

Shuhei Yokoo, Kohei Ozaki, Edgar Simo-Serra, and Satoshi Iizuka. Two-stage discriminative re-ranking for large-scale landmark retrieval. In Proc. CVPR Workshops, 2020.

Songtao Liu, Zeming Li, and Jian Sun. Self-emd: Self-supervised object detection without imagenet. arXiv preprint arXiv:2011.13677, 2020.

Tianjun Xiao, Yichong Xu, Kuiyuan Yang, Jiaxing Zhang, Yuxin Peng, and Zheng Zhang. The application of two-level attention models in deep convolutional neural network for fine-grained image classification. In Proc. CVPR, 2015.

Tobias Weyand, Andre Araujo, Bingyi Cao, and Jack Sim. Google landmarks dataset v2-a large-scale benchmark for instance-level recognition and retrieval. In Proc. CVPR, 2020.

Tony Ng, Vassileios Balntas, Yurun Tian, and Krystian Mikolajczyk. Solar: second-order loss and attention for image retrieval. In Proc. ECCV, 2020.

Torsten Sattler, Will Madder, Carl Toft, Akihiko Torii, Lars Hammarstrand, Erik Stenborg, Daniel Safari, Masatoshi Okutomi, Marc Pollefeys, Josef Sivic, et al. Benchmarking 6dof outdoor visual localization in changing conditions. In Proc. CVPR, 2018.

Xinlong Wang, Rufeng Zhang, Chunhua Shen, Tao Kong, and Lei Li. Dense contrastive learning for self-supervised visual pre-training. In Proc. CVPR, 2021a.

Y-Lan Boureau, Francis Bach, Yann LeCun, and Jean Ponce. Learning mid-level features for recognition. In Proc. CVPR, 2010.

Yunpeng Chen, Marcus Rohrbach, Zhicheng Yan, Yan Shuicheng, Jiashi Feng, and Yannis Kalantidis. Graphbased global reasoning networks. In Proc. CVPR, 2019.

Zhaoqing Wang, Qiang Li, Guoxin Zhang, Pengfei Wan, Wen Zheng, Nannan Wang, Mingming Gong, and Tongliang Liu. Exploring set similarity for dense self-supervised representation learning. arXiv preprint arXiv:2107.08712, 2021b.

Zhenda Xie, Yutong Lin, Zheng Zhang, Yue Cao, Stephen Lin, and Han Hu. Propagate yourself: Exploring pixel-level consistency for unsupervised visual representation learning. In Proc. CVPR, 2021.

* cited by examiner

SYSTEMS AND METHODS FOR IMAGE RETRIEVAL USING SUPER FEATURES

CROSS-REFERENCE TO RELATED APPLICATIONS

This application claims the benefit of U.S. Provisional Application No. 63/252,223, filed on Oct. 5, 2021. The entire disclosure of the application referenced above is incorporated herein by reference.

FIELD

The present disclosure relates to image retrieval systems and methods and more particularly to systems and methods for image retrieval using super features and systems and methods for training of the same.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Navigating robots are mobile robots that may be trained to navigate environments without colliding with objects during travel. Navigating robots may be trained in the environment in which they will operate or trained to operate regardless of environment.

Navigating robots may be used in various different industries. One example of a navigating robot is a package handler robot that navigates an indoor space (e.g., a warehouse) to move one or more packages to a destination location. Another example of a navigating robot is an autonomous vehicle that navigates an outdoor space (e.g., roadways) to move one or more occupants from a pickup to a destination.

SUMMARY

In a feature, an image retrieval system includes: a convolutional neural network (CNN) module configured to generate local features based on an input image; an iterative attention module configured to, via T iterations, generate an ordered set of super features in the input image based on the local features, where T is an integer greater than 1; and a selection module configured to select a second image from a plurality of images in an image database based on the second image having a second ordered set of super features that most closely match the ordered set of super features in the input image, where the super features in the set of super features do not include redundant local features of the input image.

In further features, the iterative attention module is configured to: during a first one of the T iterations, generate a third ordered set of super features in the input image further based on an ordered set of predetermined initialization super features and the local features; and generate the ordered set of super features based on the third ordered set of super features.

In further features, the iterative attention module is configured to: during a second one of the T iterations that is after the first one of the T iterations, generate a fourth ordered set of super features in the input image further based on the third ordered set of super features and the local features; and generate the ordered set of super features based on the fourth ordered set of super features.

In further features, the iterative attention module is configured to: during an N-th one of the T iterations, where N is an integer less than or equal to T, generate an N-th ordered set of super features in the input image further based on (a) an N−1th ordered set of super features for an N−1th iteration of the T iterations and (b) the local features; and generate the ordered set of super features based on the N-th ordered set of super features.

In further features, the iterative attention module is configured to, during the N-th one of the T iterations: determine a first linear projection of the local features; determine a second linear projection of the local features; determine a third linear projection of the N−1th ordered set of super features; and generate the ordered set of super features in the input image based on the first, second, and third linear projections.

In further features, the iterative attention module is configured to: determine a fourth linear projection based on a product of the first and third linear projections; generate attention maps for the input image based on the fourth linear projection; and generate the ordered set of super features in the input image based on the attention maps and the second linear projection.

In further features, the iterative attention module is configured to generate the attention maps for the input image by: scaling the fourth linear projection; applying a softmax function after the scaling; and normalizing a result of the scaling.

In further features, the iterative attention module is configured to: determine first features based on the attention maps and the second linear projection; determine second features based on the third linear projection and the first features; and generate the ordered set of super features in the input image based on the second features.

In further features, the iterative attention module includes a multi layer perceptron (MLP) configured to generate an output based on the second features, wherein the iterative attention module is configured to generate the ordered set of super features in the input image based on (a) the second features and (b) the output of the MLP module.

In further features, the iterative attention module is trained by minimizing a contrastive loss.

In further features, the iterative attention module is trained by minimizing a cosine similarity loss.

In further features: the CNN module receives the input image from a computing device via a network; and the selection module transmits the second image to the computing device via the network.

In further features, the computing device is configured to at least one of: display the second image on a display; and display information regarding the second image on the display; and audibly output the information regarding the second image via a speaker.

In further features, a system includes: the image retrieval system; a camera configured to capture the input image; and a pose and location module configured to determine at least one of: a present location based on the second image; and a pose of the camera based on the second image.

In a feature, a training system includes: an iterative attention module configured to, based on first features in input images, determine ordered sets of second features using iterative attention over T iterations, where T is an integer greater than or equal to two; and a training module configured to: selectively input pairs of matching images to the iterative attention module; selectively input non-matching images to the iterative attention module; and based on the ordered sets generated by the iterative attention module based on the input pairs of matching images and the input non-matching images, train the iterative attention module based on minimizing at least one of: a contrastive loss; and a cosine similarity loss.

In further features, the training module is configured to train the iterative attention module based on minimizing both of the contrastive loss and the cosine similarity loss.

In a feature, an image retrieval method includes: by a convolutional neural network (CNN) module, generating local features based on an input image; via T iterations, generating an ordered set of super features in the input image based on the local features using an attention module, where T is an integer greater than 1; and selecting a second image from a plurality of images in an image database based on the second image having a second ordered set of super features that most closely match the ordered set of super features in the input image, where the super features in the set of super features do not include redundant local features of the input image.

In further features, the generating the ordered set of super features includes: during a first one of the T iterations, generating a third ordered set of super features in the input image further based on an ordered set of predetermined initialization super features and the local features; and generating the ordered set of super features based on the third ordered set of super features.

In further features, the generating the ordered set of super features includes: during a second one of the T iterations that is after the first one of the T iterations, generating a fourth ordered set of super features in the input image further based on the third ordered set of super features and the local features; and generating the ordered set of super features based on the fourth ordered set of super features.

In further features, the generating the ordered set of super features includes: during an N-th one of the T iterations, where N is an integer less than or equal to T, generating an N-th ordered set of super features in the input image further based on (a) an N−1th ordered set of super features for an N−1th iteration of the T iterations and (b) the local features; and generating the ordered set of super features based on the N-th ordered set of super features.

In further features, the generating the ordered set of super features includes, during the N-th one of the T iterations: determining a first linear projection of the local features; determining a second linear projection of the local features; determining a third linear projection of the N−1th ordered set of super features; and generating the ordered set of super features in the input image based on the first, second, and third linear projections.

In further features, the generating the ordered set of super features includes: determining a fourth linear projection based on a product of the first and third linear projections; generating attention maps for the input image based on the fourth linear projection; and generating the ordered set of super features in the input image based on the attention maps and the second linear projection.

In further features, generating the attention maps includes generating the attention maps for the input image by: scaling the fourth linear projection; applying a softmax function after the scaling; and normalizing a result of the scaling.

In further features, the generating the ordered set of super features includes: determining first features based on the attention maps and the second linear projection; determining second features based on the third linear projection and the first features; and generating the ordered set of super features in the input image based on the second features.

In further features, the image retrieval method further includes generating an output based on the second features using a multi layer perceptron (MLP) module, where the generating the ordered set of super features includes generating the ordered set of super features in the input image based on (a) the second features and (b) the output of the MLP module.

In further features, the attention module is trained by minimizing a contrastive loss.

In further features, the attention module is trained by minimizing a cosine similarity loss.

In further features, the image retrieval method further includes: receiving the input image from a computing device via a network; and transmitting the second image to the computing device via the network.

In further features, the image retrieval method further includes, by the computing device, at least one of: displaying the second image on a display; and displaying information regarding the second image on the display; and audibly outputting the information regarding the second image via a speaker.

In a feature, a method includes: the image retrieval method; capturing the input image using a camera; and determining at least one of: a present location based on the second image; and a pose of the camera based on the second image.

In a feature, a training method includes: training an iterative attention module configured to, based on first features in input images, determine ordered sets of second features using iterative attention over T iterations, where T is an integer greater than or equal to two, and where the training includes: selectively inputting pairs of matching images to the iterative attention module; selectively inputting non-matching images to the iterative attention module; and based on the ordered sets generated by the iterative attention module based on the input pairs of matching images and the input non-matching images, training the iterative attention module based on minimizing at least one of: a contrastive loss; and a cosine similarity loss.

In further features, the training includes training the iterative attention module based on minimizing both of the contrastive loss and the cosine similarity loss.

In a feature, an image retrieval system includes: a means for generating local features based on an input image; a means for, via T iterations, generating an ordered set of super features in the input image based on the local features, where T is an integer greater than 1; and a means for selecting a second image from a plurality of images in an image database based on the second image having a second ordered set of super features that most closely match the ordered set of super features in the input image, where the super features in the set of super features do not include redundant local features of the input image.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure will become more fully understood from the detailed description and the accompanying drawings, wherein.

In the drawings, reference numbers may be reused to identify similar and/or identical elements.

DETAILED DESCRIPTION

Visual navigation of mobile robots combines the domains of vision and control. The vision aspect involves image retrieval. Navigation can be described as finding a suitable and non-obstructed path between a starting location and a destination location. A navigating robot includes a control module configured to move the navigating robot based on input from one or more sensors (e.g., cameras) using a trained model.

The present applications involve image retrieval systems and methods and training of such systems and methods that use mid-level features in the images, which will be referred to as super features. For each image an iterative attention module is used to produce an ordered set of super features, each being a function of the full set of local features produced by a convolutional neural network (CNN) module. A loss which operates directly on the super features is used to learn better localized feature matches, while also encouraging non-redundant features. Despite the fact that the proposed loss models a matching function (and loss) at the super feature level, it only requires image-level supervision (not pixel-level supervision or another type of supervision) and can be used instead of contrastive losses for image retrieval. The image level supervision involves knowledge of whether two images depict the same point of interest, such as landmark. Use of the super features for image retrieval outperforms other methods using the same number of features and matches performance of other methods while using significantly smaller memory footprint (i.e., less memory space).

Figure 1:
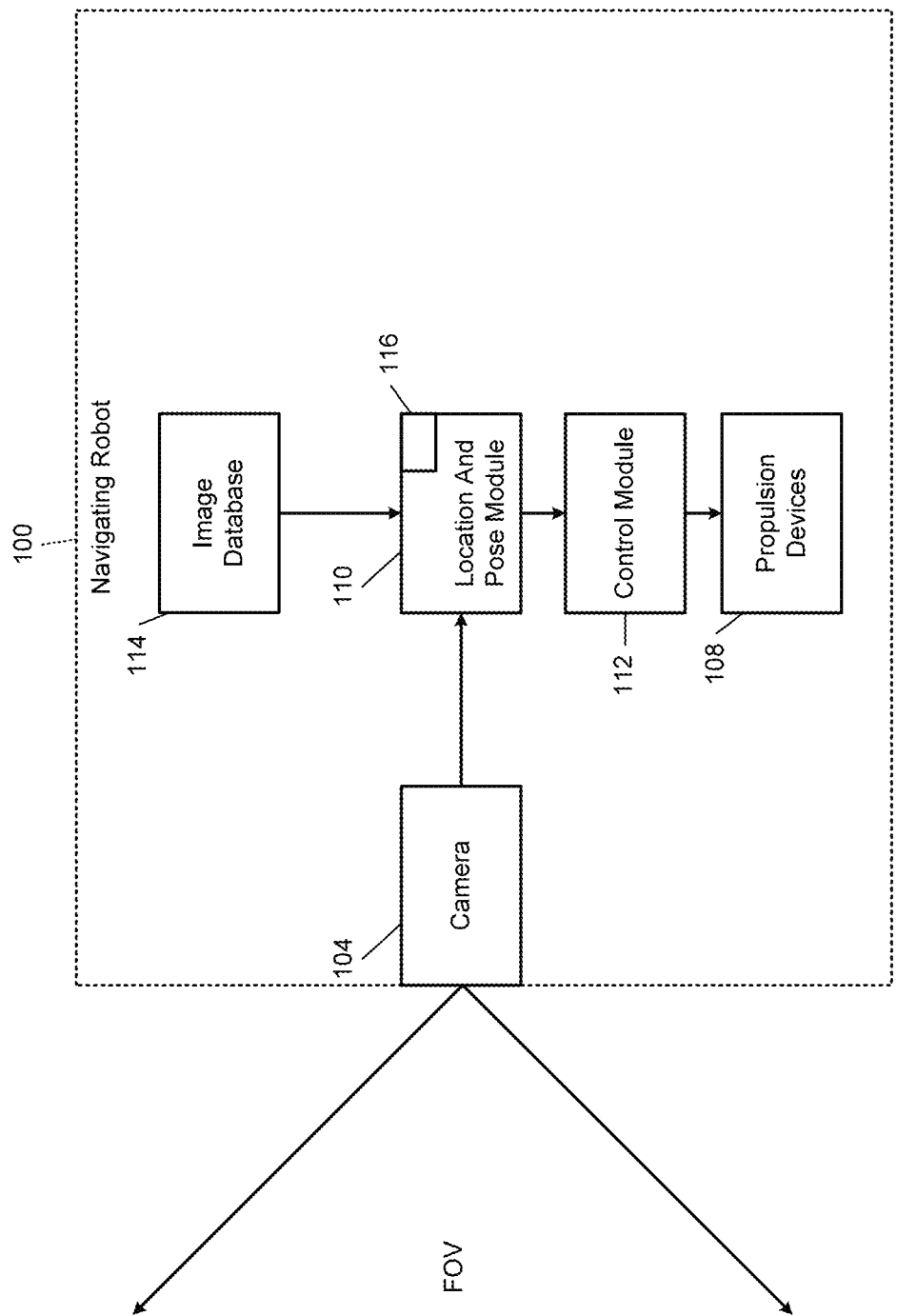
FIG. 1 is a functional block diagram of an example implementation of a navigating robot.

FIG. 1 is a functional block diagram of an example implementation of a navigating robot 100. The navigating robot 100 is a mobile vehicle. The navigating robot 100 includes a camera 104 that captures images within a predetermined field of view (FOV) in front of the navigating robot 100. The operating environment of the navigating robot 100 may be an indoor space or an outdoor space. In various implementations, the navigating robot 100 may include multiple cameras and/or one or more other types of sensing devices (e.g., LIDAR, radar, etc.).

The camera 104 may be, for example, a grayscale camera, a red, green, blue (RGB) camera, or another suitable type of camera. In various implementations, the camera 104 may also capture depth (D) information, such as in the example of a grayscale-D camera or a RGB-D camera. The camera 104 may be fixed to the navigating robot 100 such that the orientation and FOV of the camera 104 relative to the navigating robot 100 remains constant.

The navigating robot 100 includes one or more propulsion devices 108, such as one or more wheels, one or more treads/tracks, one or more moving legs, one or more propellers, and/or one or more other types of devices configured to propel the navigating robot 100 forward, backward, right, left, up, and/or down. One or a combination of two or more of the propulsion devices 108 may be used to propel the navigating robot 100 forward or backward, to turn the navigating robot 100 right, to turn the navigating robot 100 left, and/or to elevate the navigating robot 100 vertically upwardly or downwardly.

The navigating robot 100 includes a location and pose module 110 configured to determine a present location/position (e.g., three dimensional (3D) position) of the navigating robot 100 and a present pose (e.g., 3D orientation) of the navigating robot 100 based on input from the camera 104 and using a trained image retrieval module (model) 116. A three 3D position of the navigating robot 100 and a 3D orientation of the navigating robot 100 may together be said to be a 6 dimension of freedom (6DoF) pose of the navigating robot 100. The 6 DoF pose may be a relative pose or an absolute pose of the navigating robot 100. A relative pose may refer to a pose of the navigating robot 100 relative to one or more objects in the environment around the navigating robot 100. An absolute pose may refer to a pose of the navigating robot 100 within a global coordinate system.

To determine a relative pose, the image retrieval module 116 may select an image from an image database 114 that includes one or more objects that most closely match a (present) image from the camera 104. While the present application will be discussed in conjunction with the example of image retrieval in the context of robot localization, the image retrieval discussed herein is also applicable to other uses of image retrieval, such as point of interest identification and other examples.

The camera 104 may update at a predetermined frequency, such as 60 hertz (Hz), 120 Hz, or another suitable frequency. The image retrieval module 116 may select an image from the image database 114 and location and pose module 110 may generate a location and/or a pose each time the input from the camera 104 is updated.

Training of the image retrieval module 116 is discussed below.

A control module 112 is configured to control the propulsion devices 108 to navigate, such as from a starting location to a goal location, based on the location and the pose. For example, based on the location and the pose, the control module 112 may determine an action to be taken by the navigating robot 100. For example, the control module 112 may actuate the propulsion devices 108 to move the navigating robot 100 forward by a predetermined distance under some circumstances. The control module 112 may actuate the propulsion devices 108 to move the navigating robot 100 backward by a predetermined distance under some circumstances. The control module 112 may actuate the propulsion devices 108 to turn the navigating robot 100 to the right by the predetermined angle under some circumstances. The control module 112 may actuate the propulsion devices 108 to turn the navigating robot 100 to the left by the predetermined angle under some circumstances. The control module 112 may not actuate the propulsion devices 108 to not move the navigating robot 100 under some circumstances. The control module 112 may actuate the propulsion devices 108 to move the navigating robot 100 upward under some circumstances. The control module 112 may actuate the propulsion devices 108 to move the navigating robot 100 downward under some circumstances. The control module 112 may actuate the propulsion devices 108 to avoid the navigating robot 100 contacting any objects.

Image retrieval is a task that models exemplar-based recognition, i.e. a class-agnostic, fine-grained understanding task which involves retrieval of all images matching a query image over an (often very large) image collection. Image retrieval also involves learning features that are discriminative enough for a highly detailed visual understanding but also robust enough to extreme viewpoint/pose or illumination changes. One use of image retrieval is for robot localization, such as discussed above, and also for landmark (or point of interest) retrieval, whose goal is to retrieve the exact same landmark among a large dataset of landmark images, many of which possibly containing a different landmark from the exact same fine-grained class (e.g., 'gothic-era churches with twin bell towers).

The present application involves a training framework and image representation based (e.g., solely) on attentional, mid-level features that are referred to as super-features. Other attentions models may not perform well. The present application involves attention models tailored for image retrieval using super features used in increased numbers and utilizing an unsupervised local loss directly on the super features. For example, an orthogonality loss may be used. The number of super features used are fewer, more semantic and therefore less redundant than local features. The training is performed with a loss directly on the same super features used for retrieval to increase accuracy. Produced is a semantically ordered set of super features, with the initial latent variables controlling their content. This makes it easier to guide feature-level matching, by constraining matched features to have the same super-feature index.

Figure 2:
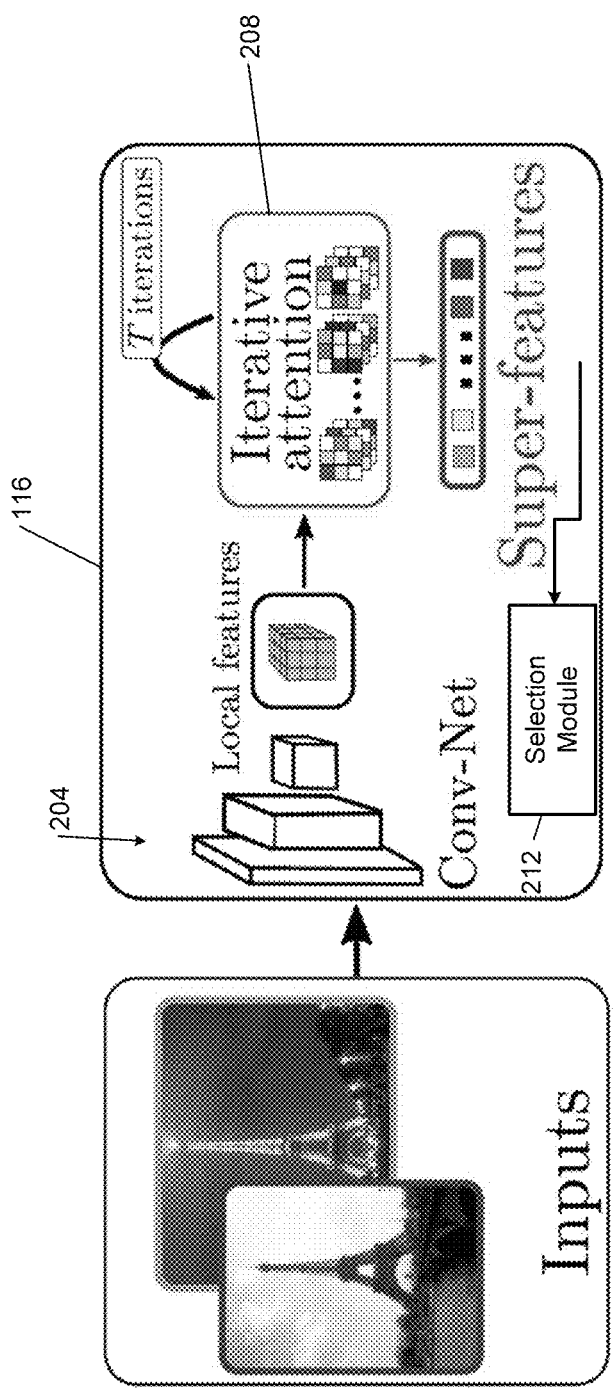
FIG. 2 is a functional block diagram of an example implementation of an image retrieval module.

FIG. 2 is a functional block diagram of an example implementation of the image retrieval module 116. The image retrieval module 116 includes a convolutional neural network (CNN) module 204 configured to generate local features (matrices) for input images. The input images include an image from an input device (e.g., the camera 104, a scanner, such as a 3D LIDAR sensor, etc.) and images from the image database 114. The CNN module 204 generates local features for each input image. The CNN module 204 may have a ResNet50 based architecture or another suitable architecture. The ResNet50 architecture is a CNN that is 50 layers deep including 48 convolutional layers, 1 MaxPool layer, and 1 average pool layer. For example, the CNN module 204 may include the ResNet50 CNN module but omit one or more of the final convolutional layers.

The image retrieval module 116 also includes an iterative attention module 208. The iterative attention module 208 generates super features (matrices) for an image based on the local features for the image. The iterative attention module 208 generates super features for each of the images.

A selection module 212 selects one of the images in the image database 114 based on the super features of the image from the input device and the super features of the images in the database 114. The selection module 212 may, for example, select the one of the images in the image database 114 that has super features that most closely match the super features of the image from the input device. The selected image and the image from the input device may be used by the location and pose module 110 to determine the location and pose, such as described above. Additional stored data regarding the selected image may also be used by the location and pose module 110 to determine the location and pose. In various implementations, the selection module 212 may select the top k number of images in the image database 114 that most closely match the image, where k may be 10, 20, 50, or another suitable number.

Predetermined initialization super features are input to the iterative attention module 208 along with the local features. The iterative attention module 208 determines first iteration super features for a first of T iterations based on the predetermined initialization super features and the local features. The iterative attention module 208 determines second iteration super features based on the first iteration super features and the local features. The iterative attention module 208 determines third iteration super features based on the second iteration super features and the local features, and so on. T iterations are performed, and the super features are output and used after the T iterations are complete. T is an integer greater than or equal to 2, such as 6. Each set of super features is an ordered set. In various implementations, T=6 may provide a best accuracy.

Figure 3:
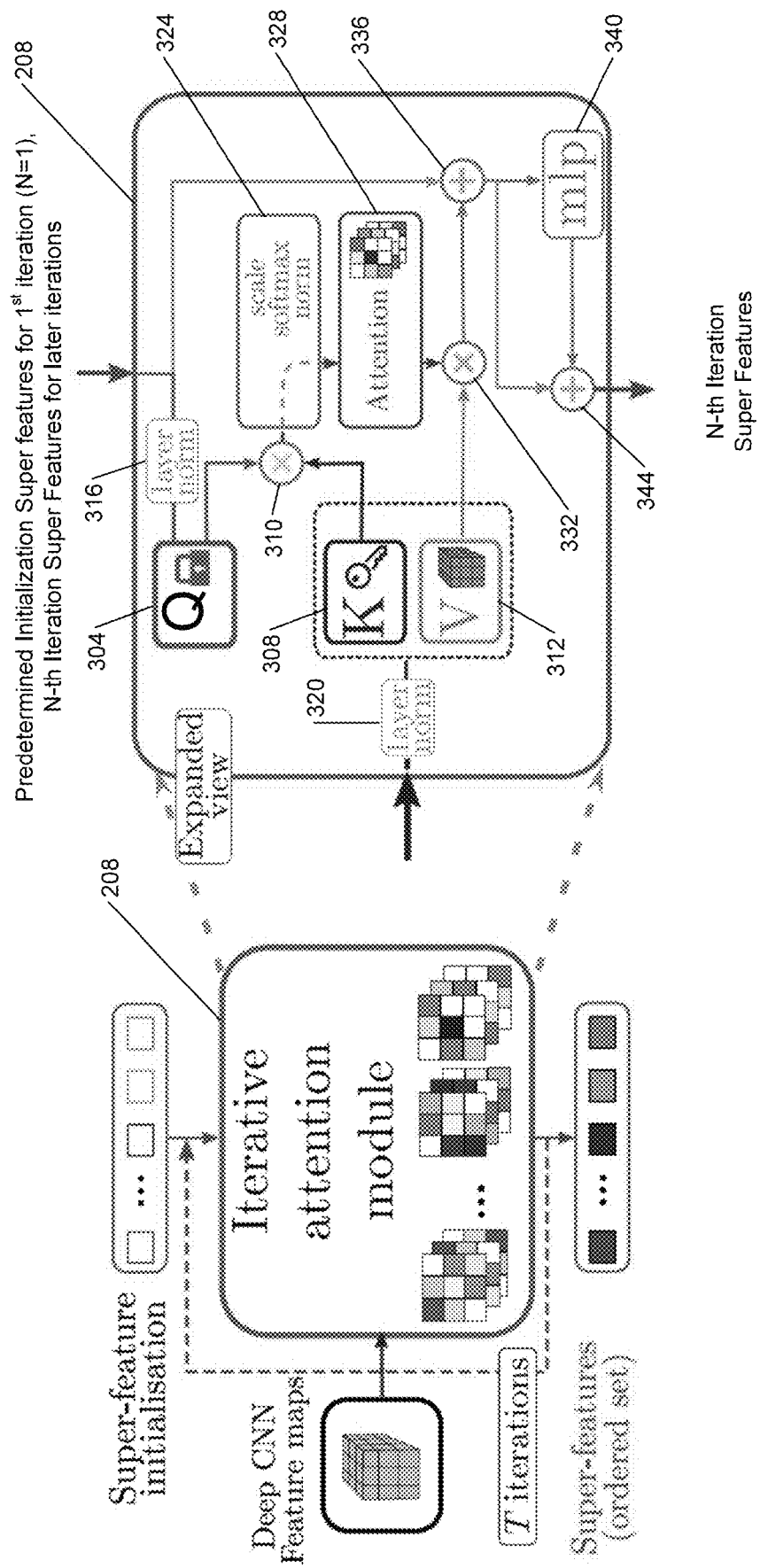
FIG. 3 is a functional block diagram of an example iterative attention module.

FIG. 3 is a functional block diagram of an example implementation of the iterative attention module 208. The iterative attention module 208 includes linear projection modules 304, 308, and 312. A first normalization module 316 normalizes input super features and provides normalized super features to the linear projection module 304. In the first iteration (N=1), the input super features are the predetermined initialization super features. In iterations N=2 to N=T, the input super features are the N−1 iteration super features fed back. The linear projection module 304 generates a first linear projection based on the normalized super features by linearly projecting the normalized super features using a first linear projection.

A second normalization module 320 normalizes local features and provides normalized local features to the linear projection modules 308 and 312. The linear projection module 308 generates a second linear projection based on the normalized local features by linearly projecting the normalized local features using a second linear projection. The linear projection module 312 generates a third linear projection based on the normalized local features by linearly projecting the normalized local features using a third linear projection.

The architecture of the iterative attention module 208 is similar to the Transformer architecture described in Ashish Vaswani, Noam Shazeer, Niki Parmar, Jakob Uszkoreit, Llion Jones, Aidan N Gomez, Lukasz Kaiser, and Illia Polosukhin, "Attention is all you need", In I. Guyon, U. V. Luxburg, S. Bengio, H. Wallach, R. Fergus, S. Vishwanathan, and R. Garnett, editors, Advances in Neural Information Processing Systems 30, pages 5998-6008, Curran Associates, Inc., 2017, see also arXiv.org publication 1706.03762 v5 and U.S. Pat. No. 10,452,978, which are incorporated herein in their entirety.

More generally attention mechanisms in the Transformer architecture allow for the amplification of relevant signals in a neural network, similar to the way a human is able to intuitively focus on certain parts of an image and know what is important. Self-attention mechanisms are attention mechanisms that relate different positions of a sequence (e.g., determining correlation of words in a sentence). Transformers are one way to implement a self-attention mechanism that maps queries against a set of keys to present values, which together define an embedding matrix.

The above architecture of the iterative attention module 208, however, is different than the Transformer architecture in that the same input is input to each of the first, second, and third linear projections in the Transformer architecture. As described above and as illustrated in the example of FIG. 3, one input is to the linear projection modules 308 and 312, while another input is to the linear projection module 304. While examples are provided, other attention mechanisms may be used for scoring described herein with the above architecture to carry out the methods described herein.

A multiplier module 310 multiplies the first linear projection with the second linear projection to produce a fourth linear projection. A scalar, softmax, and normalization module 324 scales the fourth linear projection, applies the softmax function, and normalizes the result of the softmax function to produce attention maps (matrices) as illustrated by 328. A multiplier module 332 multiplies the third linear projection with the attention maps to produce first features.

An adder module 336 adds the input super features with the first features to produce second features. A multi layer perceptron (MLP) module 340 processes the second features to produce an output based on the second features. While the example of a MLP module 340 is provided, another suitable type of artificial neural network (ANN) or another suitable type of neural network may be used.

An adder module 344 adds the output of the MLP module 340 with the second features to produce the super features for the N-th iteration. When N=T, the super features are output and used. When N is less than T, N is incremented, and the N−1th iteration super features are fed back to the iterative attention module 208 as discussed above.

Let function $f: \chi \to \mathbb{R}^{W \times H \times D}$ denote a convolutional neural network (CNN) backbone (the CNN module 204) that encodes an input image $\chi \in I$ into a (W×H×D)-sized tensor of D-dimensional local activations over a (W×H) spatial grid. After flattening the spatial dimensions, the output of $f$ can also be seen as set of L=W·H vectors denoted by U={$u_l \in \mathbb{R}^D$:l∈1...L}. The size of this set varies with the resolution of the input image. The CNN module 204 may also whiten and reduce the dimensionality of local descriptors. Let function o(•) compactly represent this two-stage process. Given a set of local features, the CNN module 204 may generate a global representation for the image using global average pooling.

The iterative attention module 208 generates and outputs a set of N aggregated super-features. The iterative attention module 208 may be represented by the function $\phi(\mathcal{U})$: $\mathbb{R}^{L \times D} \to \mathbb{R}^{N \times D}$ that takes as input the set of L local features $\mathcal{U}$ and aggregates them into N mid-level super-features.

The iterative attention module 208 may include a dot-product attention function followed by a multi-layer perceptron, as discussed above. The dot-product attention function has three named inputs, the key (K), the value (V), and the query (Q) which are the result of linear projections K, V, and Q to dimensions $d_k$, $d_v$, and $d_Q$ respectively. The local features from $\mathcal{U}$ are normalized with layer normalization (let $\tilde{x}$ denote that x has been normalized) then projected to key (k) and value (v) inputs, while the query input is an ordered set of N super feature templates, denoted as Q={$q_j \in \mathbb{R}^{d_Q}$, j=1 . . . N}. The super feature templates are refined across multiple iterations by applying the function $\phi$ multiple times, while also progressively forming attention maps for the super features.

Regarding a single iteration of $\phi(\mathcal{U}; Q)$, following dot-product attention, the attention weights are given by:

$$\alpha = [\alpha_1; \ldots \alpha_L] \in \mathbb{R}^{L \times N}, \alpha_l = \frac{\tilde{\alpha}_l}{\sum_{i=1}^{L} \tilde{\alpha}_i},$$

$$\tilde{\alpha}_l = \frac{e^{M_l}}{\sum_{j=1}^{N} e^{M_{lj}}}, M_{lj} = \frac{K(\tilde{u}_l)Q(\tilde{q}_j)}{\sqrt{d_Q}}$$

with [$\alpha_l$] denoting stacking of vectors $\alpha_l$ into a matrix. The dot product between keys and the super feature templates can be interpreted as a tensor of compatibility scores between local features and the super feature templates. The iterative attention module 208 normalizes the scores across templates via a softmax function, and turns the normalized scores into attention maps by L1 normalization. After computing the attention maps, the output of function $\phi$ is given by:

$$\phi(\mathcal{U}; Q) = \text{MLP}(\psi(\mathcal{U}; Q)) + \psi(\mathcal{U}; Q), \psi(\mathcal{U}; Q) = \alpha \cdot V(\mathcal{U}) + Q$$

where MLP is the MLP function and is composed of a layer-norm, a fully-connected layer with half the dimensions of the features, a ReLU activation function, and another fully-connected layer that projects features back to their initial dimension.

To obtain the final result, as stated above, the function is applied iteratively for T iterations by the iterative attention module 208. The predetermined initialization super features for the templates at the first iteration are treated as a learnable parameter matrix $Q^0 \times \mathbb{R}^{N \times d_Q}$ define $Q^t = \phi^t(\mathcal{U}; Q^{t-1})$ and denote the final output as $\Phi(\mathcal{U}) = Q^T$. All of the weights of the projections K, Q, and V may be shared across iterations and that a layer normalization is performed before each projection. Instead of initializing the super feature templates each time (e.g. image), the initializations of the super feature templates are learned directly, i.e., the queries are $N \times d_Q$ learnable parameters.

The iterative attention module 208 runs iteratively T times and maps a variable number of features to a constant number N of outputs. The output of the softmax function is normalized by the iterative attention module 208 with an L1 norm across pixels to make all pixels contribute equally to the set of super features. External latent initialization may be used and learned rather than random initialization. Random initialization would not provide an ordered set of super features.

To obtain the final set of super features, the iterative attention module 208 may whiten and normalize the final set of super features. The normalization may be, for example, L2 normalization or another suitable type of normalization. The final set of super features (after the whitening and normalization) can be described as:

$$S = \left\{ s_i : s_i = \frac{o(\hat{s}_i)}{\|o(\hat{s}_i)\|_2}, i = 1, \ldots, N \right\},$$

where o(•) denotes dimensionality reduction and whitening.

Figure 4:
FIG. 4 is an example image including images and example attention maps, respectively.

FIG. 4 includes an example illustration of images in the left column and corresponding attention maps in the right three columns generated as described above. The attentions correspond to responses to some patterns/semantics/features of the images, such as semicircles in the second column from the left and windows in the third column from the left.

Figure 5:
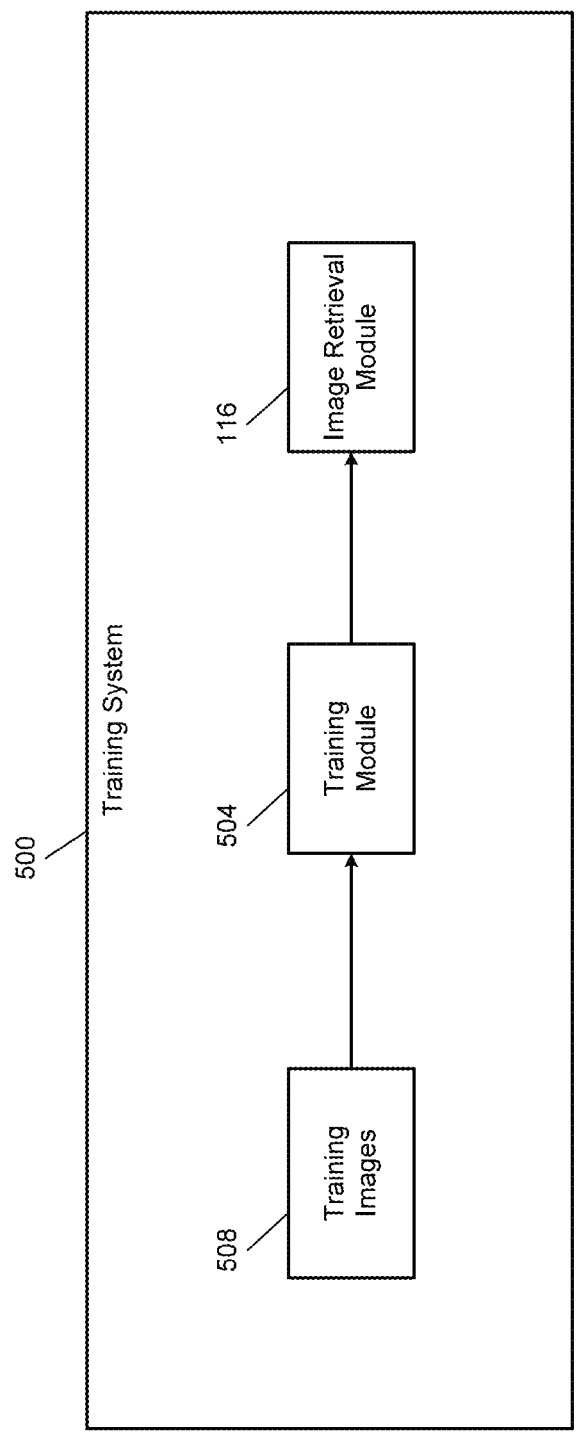
FIG. 5 is a functional block diagram of an example training system.

FIG. 5 includes a functional block diagram of an example training system 500 for training the module 116 for image retrieval and location and pose estimation, such as for the navigating robot 100. A training module 504 trains the module 116 using a set of training images 508 stored in memory as discussed further below.

Some or all of the parameters of the module 116 may be fine-tuned during training by the training module 504 using contrastive learning, such as using a global contrastive loss directly on the super features. The training images 508 include positive pairs of images and negative images. The positive pairs are images of the same instance/object as would be retrieved if given one of the images of a pair. The negative images include images of different instances/objects.

Figure 6A:
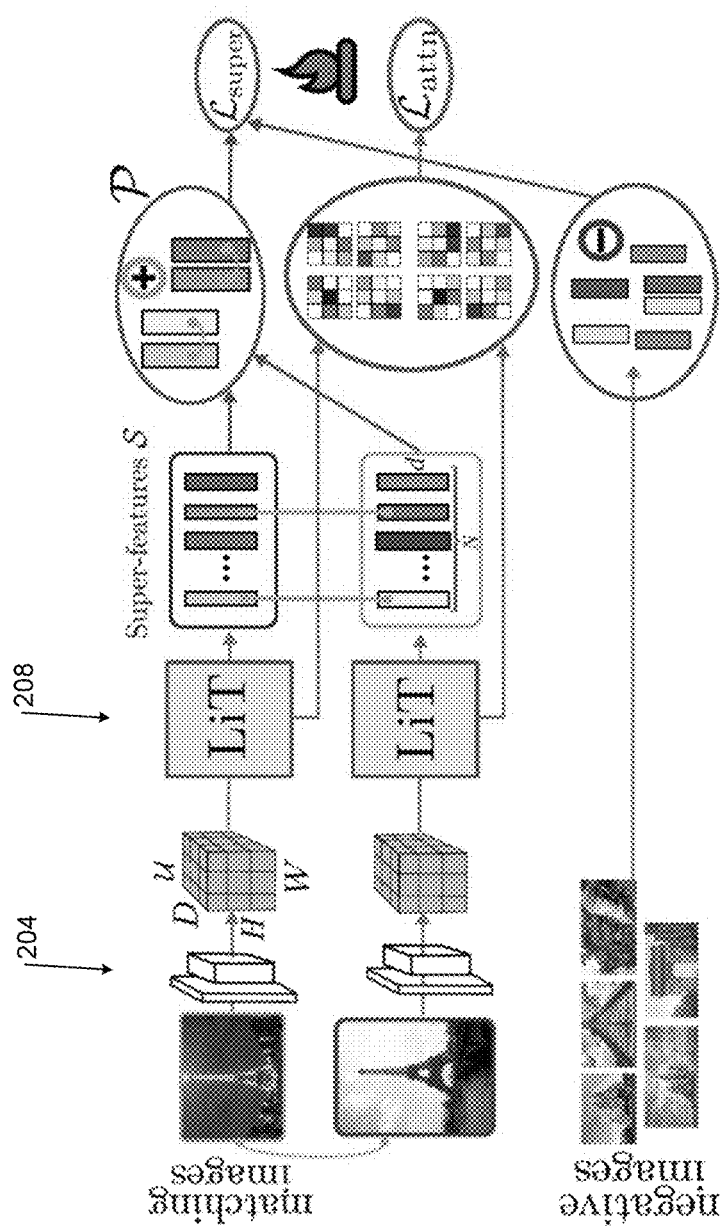
FIG. 6A is a functional block diagrams of an example training system.
Figure 6B:
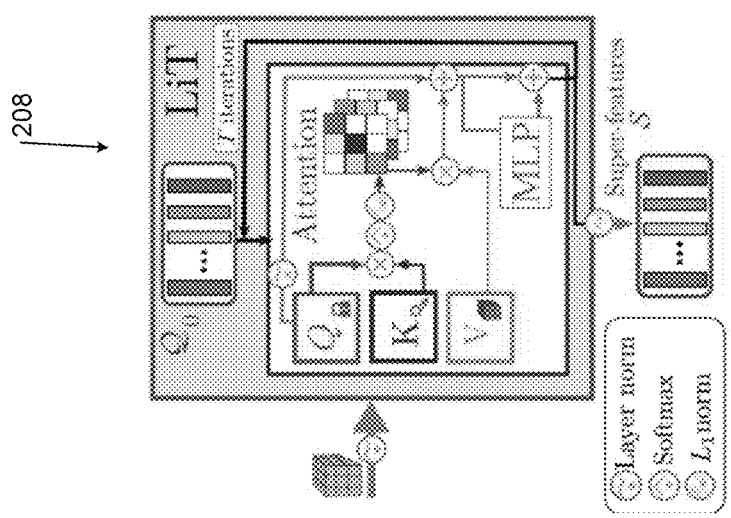
FIG. 6B is a functional block diagram of an example iterative attention module.
Figure 7:
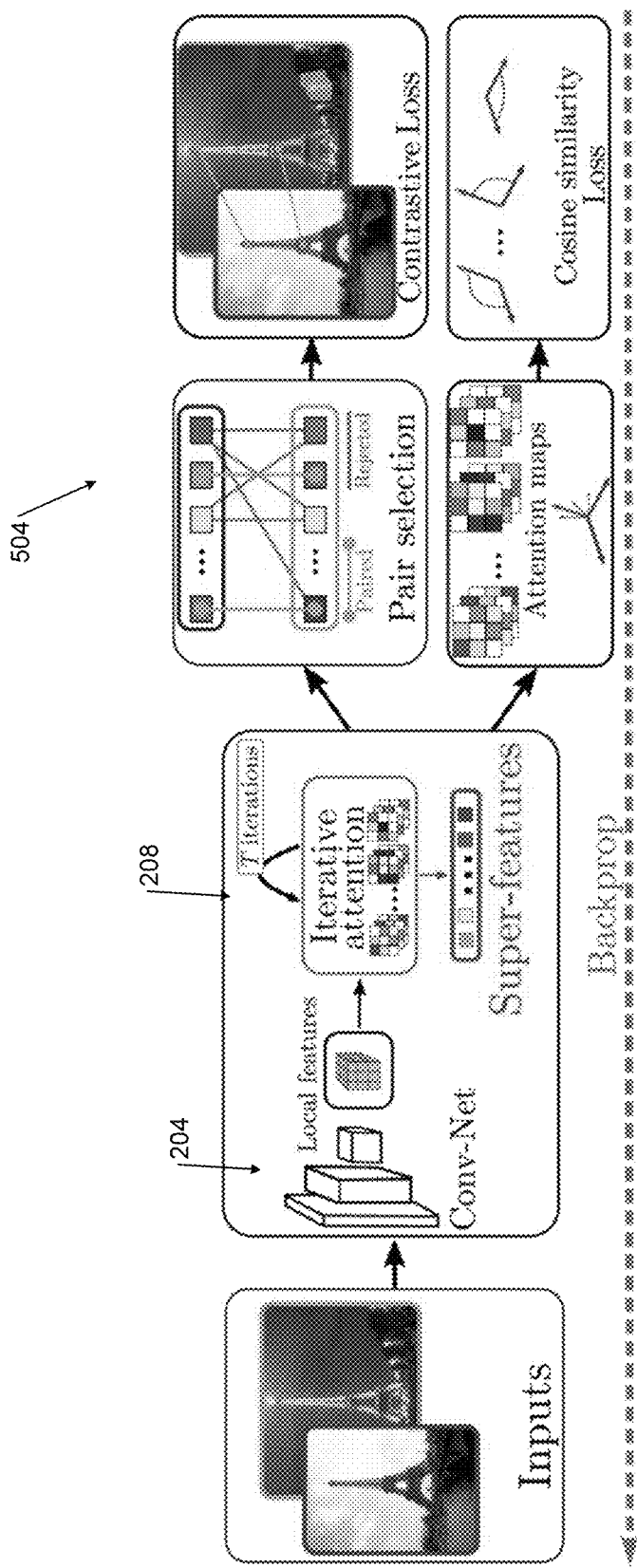
FIG. 7 is an example block diagram of training with back propagation of a contrastive loss and cosine similarity loss.

FIGS. 6A, 6B and 7 are example block diagrams of the training system shown in FIG. 5. FIG. 6A presents an overview of an embodiment of learning super-features. FIG. 6B includes a functional block diagram of an example implementation of the iterative attention module 208. Given a pair of matching images encoded by a CNN encoder, the iterative attention module 208 outputs an ordered set of super-features S. A filtering process keeps only reliable super-feature pairs across matching images at P, which are fed into a super-feature-level contrastive loss, while a decorrelation loss reduces the spatial redundancy of the super-features attention masks for each image. The training images 508 (which are shown in FIG. 6A as negative images and matching images) also include annotations that indicate whether each pair is matching or not. For example, a pair of images has an annotation stored that indicates whether the two images of the pair match each other or not. The iterative attention module 208 shown in FIGS. 3 and 4 is illustrated by LiT in the examples of FIGS. 6A and 6B. FIG. 6B includes a more detailed functional block diagram of each iterative attention module. FIG. 7 is a functional block diagram of training with back propagation of the contrastive loss and cosine similarity loss.

For positive pairs of images, the training module 504 identifies matching super features. The training module 504 may identify matching super features in a pair of positive (matching) images, for example, based on nearest neighbor matching. The fact that the super features are ordered may minimize and filter out erroneous matches. The matching may also be refined using reciprocity constraints and constraints on nearest neighbor distance ratios.

For any $s \in S$, let $i(s)$ be the function that returns the position/order in a super feature (ordered set) or super feature ID, i.e., $i(s_i) = I$, $\forall_{s_i} \in S$. Let function $n(s,S) = \mathrm{argmin}_{s_j \in S} \|s - s_j\|_2$ be the function that returns the nearest neighbor of s from set S. Given a positive pair of images x and $x^+$, let $s \in S$, $s' \in S'$ be two super features from the super feature sets S and S', respectively. For the super feature pair (s,s') to be considered eligible by the training module 504, all of the following criteria must be met: (a) s,s' are reciprocal nearest neighbors, (b) s,s' pass the Lowe first to second neighbor ratio test, and (c) s,s' have the same super feature ID. Let P be the set of eligible pairs and r be the hyper parameter that controls the ratio test, the conditions above can be written as:

$$(s, s') \in P \Leftrightarrow \left\{ \begin{matrix} s = n(s', S) \\ s' = n(s, S') \end{matrix} \right\} \text{ and } \left\{ \begin{matrix} i(s) = i(s') \\ \|s - s'\|_2 / \|s - n(s, S' \setminus \{s'\})\|_2 \end{matrix} \right.$$

$\tau$ is a predetermined value and may be, for example, 0.9 or another suitable value. The criteria above are important to achieving a high level of image retrieval performance.

Once the set of P of all eligible super feature pairs is constructed, the training module 504 determines a contrastive loss on the eligible pairs. Let pair $p=(s, s^+) \in P$ a pair of super features extracted from a pair of matching images x, $x^+$. Let $N(j) = \{n_j^k: k=1 \ldots n, j=1 \ldots N\}$ be the set of super features with super feature ID j extracted from negative images $(y_T, \ldots, y_T)$. The contrastive super feature loss (the contrastive loss of the super features) can be written as:

$$\mathcal{L}_{super} = \Sigma_{(s,s^+ \in P)} [\|s - s^+\|_2 + \Sigma_{n \in N(i(s))} [u' - \|s - n\|_2^2]^+],$$

where u' is a margin hyper parameter and the negatives for each s are given by super features from all negative images with the same super feature ID as s.

To obtain super features that are as complementary to each other as possible, the training module 504 trains the module (the iterative attention module 208) to attend to different local features, i.e., to different locations of the input image. The training module 504 may minimize a cosine similarity between the attention maps of all super features of each image (after the last iteration for each image). Let $\alpha = [\alpha_j]$, $\alpha_j \in \mathbb{R}^L$, $j=1, \ldots, N$ be the attention maps after the last iteration of the iterative attention module 208. The attention decorrelation loss (minimized by the training module 504) may be described by:

$$\mathcal{L}_{attn}(x) = \frac{1}{N(N-1)} \sum_{i \neq j} \frac{\alpha_i^T \cdot \alpha_j}{\|\alpha_i\|_2 \|\alpha_j\|_2}, i, j \in \{1, \ldots, N\}.$$

In other words, the training module 504 minimizes the loss of the off-diagonal elements of the N×N self-correlation matrix $\alpha^T \alpha$. The training module 504 may determine a similarity between images, for example, using ASMK similarity or another suitable type of similarity configured to compare sets of features. ASMK similarity is described in Giorgos Tolias, et al., titled *To Aggregate or not to Aggregate: Selective Match Kernals for Image Search*, in Proc., ICCV, 2013, which is incorporated herein in its entirety.

The training module 504 may train the module 116 to minimize both of the above losses. Training the module 116 to minimize the above losses achieves performance improvements on image retrieval. Additionally adding a global loss may improve performance to some extent. In various implementations, the training module 504 may train the module 116 to minimize a contrastive loss determined based on the super features of the positive pairs and a cosine similarity loss determined based on the super features as illustrated in the example of FIG. 3. The training module 504 may adjust one or more parameters of the module 116 to minimize the above losses. For example, the training module 504 may adjust parameters of the iterative attention module 208 to minimize the above losses. The training module 504 may also train the predetermined initialization super features based on minimizing the losses above.

Figure 8:
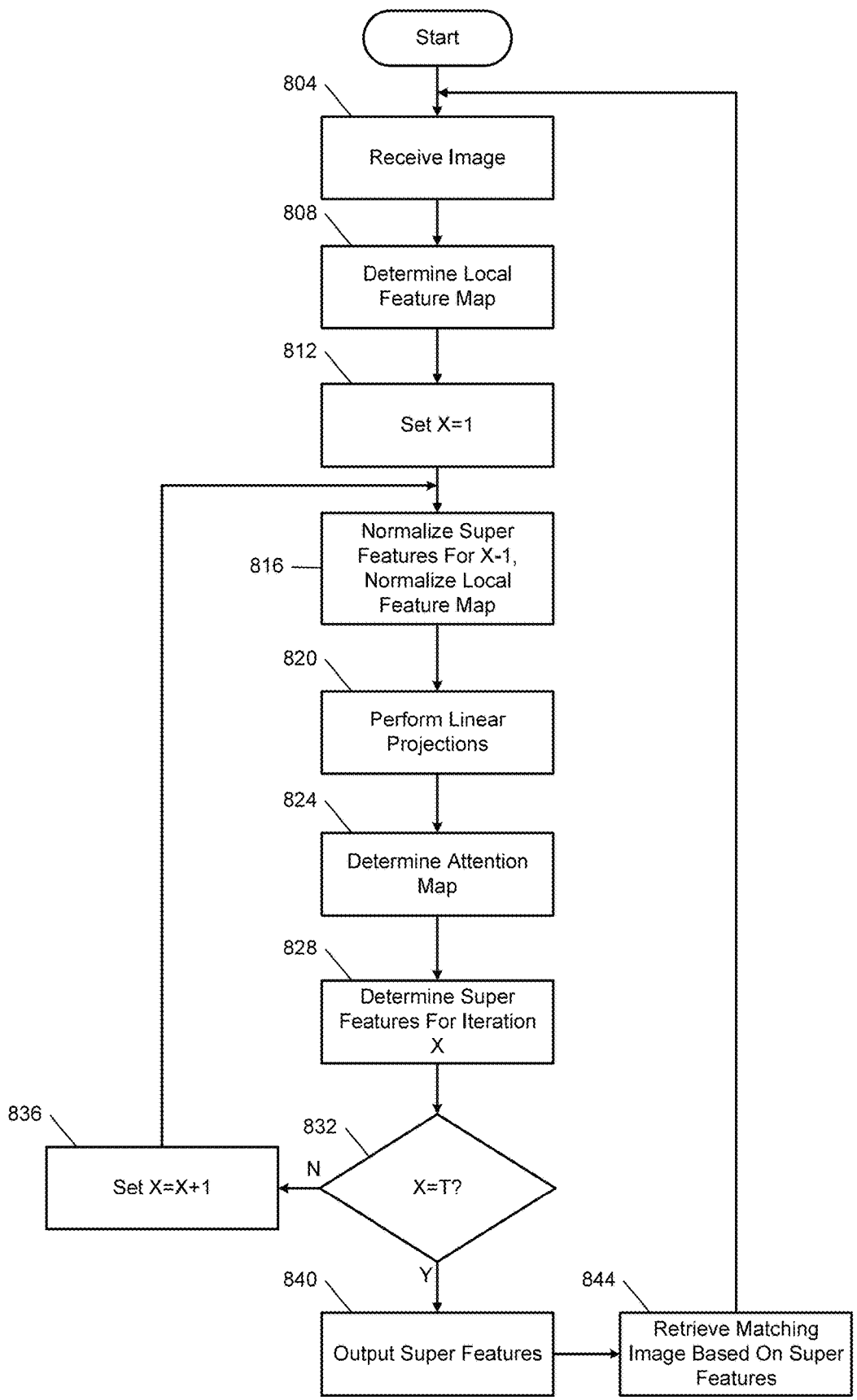
FIG. 8 is a flowchart depicting an example method of image retrieval.

FIG. 8 is a flowchart depicting an example method of retrieving images using super features and determining pose and location of an input device, such as a camera or a scanner. Control begins with 804 where the CNN module 204 receives an image from the input device. At 808, the CNN module 204 determines a local feature map based on the image.

At 812, the iterative attention module 208 sets a counter value X equal to 1. At 816, the iterative attention module 208 normalizes the super features from iteration X−1 and normalizes the local feature map. When X−1=0, the predetermined initialization super features are used.

At 820, the iterative attention module 208 (e.g., 304, 308, and 312) generates the linear projections as described above. At 824, the iterative attention module 208 (e.g., 324, 332, 336) determines the attention maps as described above. At 828, the iterative attention module 208 determines the super features for iteration N as described above.

The iterative attention module 208 determines whether the counter value X is equal to a predetermined number of iterations T at 832. T is an integer greater than or equal to 2. If 832 is true, control continues with 840. If 832 is false, the iterative attention module 208 increments the counter value X by 1 (X=X+1) at 836, and control returns to 816 for a next iteration.

At 840, the iterative attention module 208 outputs the super features for the image. At 844, the selection module 212 selects one of the images from the image database 114 having super features that most closely match the super features of the image. In other words, the selection module 212 retrieves the one of the images from the image database 114 that has super features that most closely match the super features of the image. The selected/retrieved image may be used in one or more manners. For example, the location and pose module 110 may determine a present location and a present pose of the camera based on the image, the selected image, and attributes (e.g., pose and location) associated with the selected image.

As another example, a computing device may transmit the image to the CNN module 204, the iterative attention module 208, and the selection module 212 via a network. Examples of computing devices include mobile phones, tablet devices, laptop computers, desktop computers, wearable devices (e.g., smart glasses, watches, etc.), and other types of computing devices. The selection module 212 may select/retrieve an image from the image database 114 that has super features that most closely match the super features of the received image. The selection module 212 may transmit the selected/retrieved image back to the computing device (that transmitted the image). The selection module 212 may also transmit to the computing device other information regarding one or more objects in the selected image. The computing device may output the selected image and/or the other information, such as to a user. For example, the computing device may at least one of: display the selected image and/or the other information on a display, audibly output the other information via one or more speakers, and output information in one or other suitable manners.

Figure 9:
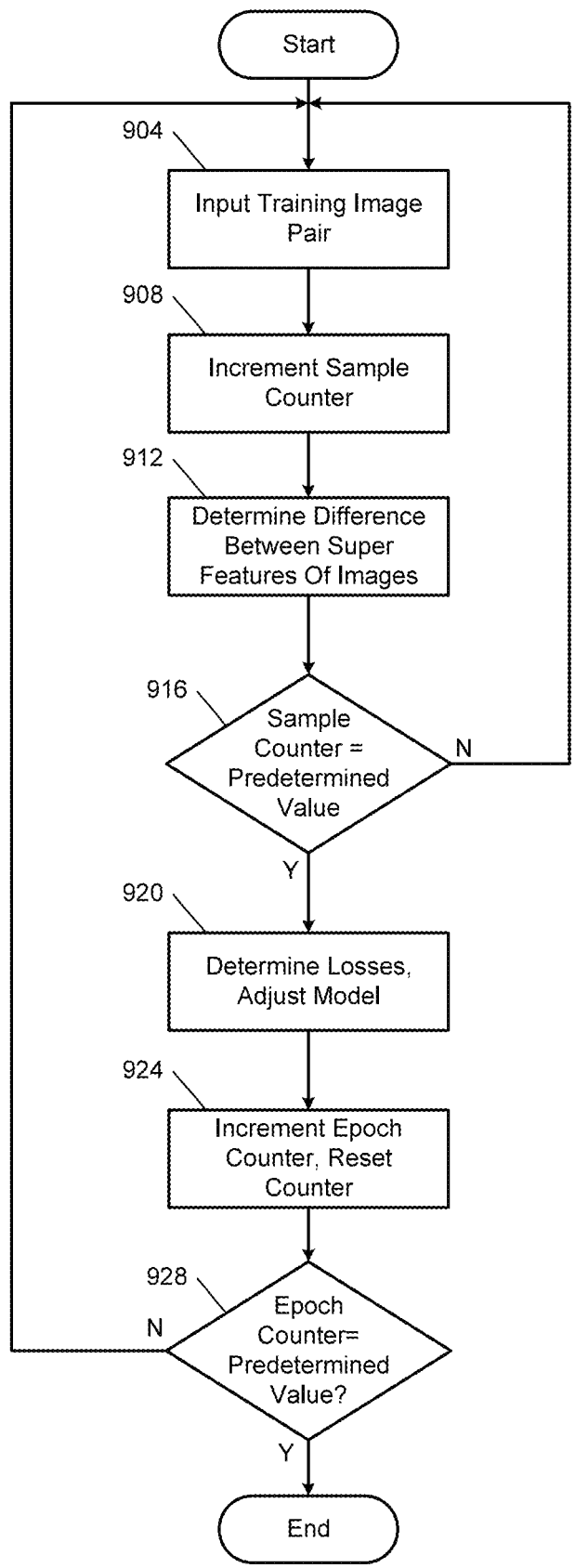
FIG. 9 is a flowchart depicting an example method of training a module for image retrieval.

FIG. 9 includes a flowchart depicting an example method of training the module 116 for image retrieval. Control begins with 904 where the training module 504 selects a pair of the training images 508 and inputs the images to one or more instances of the module 116. The module(s) determine super features for the images as described above. Pairs of positive images and pairs of negative images are input over time. The training module 504 may select the pairs of training images randomly or in a predetermined order. The training module 504 may select a first predetermined percentage of positive images and a second predetermined percentage of negative images in various implementations where a sum of the first and second predetermined percentages is equal to 100 percent.

At 908, the training module 504 increments a sample counter by 1. At 912, the training module 504 determines a difference between the super features determined by the model(s) for the pair of images. At 916, the training module 504 determines whether the sample counter is equal to a predetermined value (e.g., 500, 1000, 5,000, or another suitable number of pairs of images). If 916 is true, control continues with 920. If 916 is false, control returns to 904 for a next pair of the training images 508.

At 920, the training module 504 determines the losses as described above based on the differences determined based on the pairs of images. The training module 504 adjusts one or more parameters of the module 116 based on the losses. For example, the training module 504 adjusts one or more parameters of the module 116 (e.g., the iterative attention module 208) to increase differences between negative pairs of images and to decrease the differences between positive pairs of images.

At 924, the training module 504 increments an epoch counter by one and resets the sample counter to zero. At 928, the training module 504 determines whether the epoch counter is equal to a predetermined value (e.g., 5, 10, 20, or another suitable number of epochs). If 928 is true, control may end. If 928 is false, control may return to 904 for a next epoch.

Figure 10:
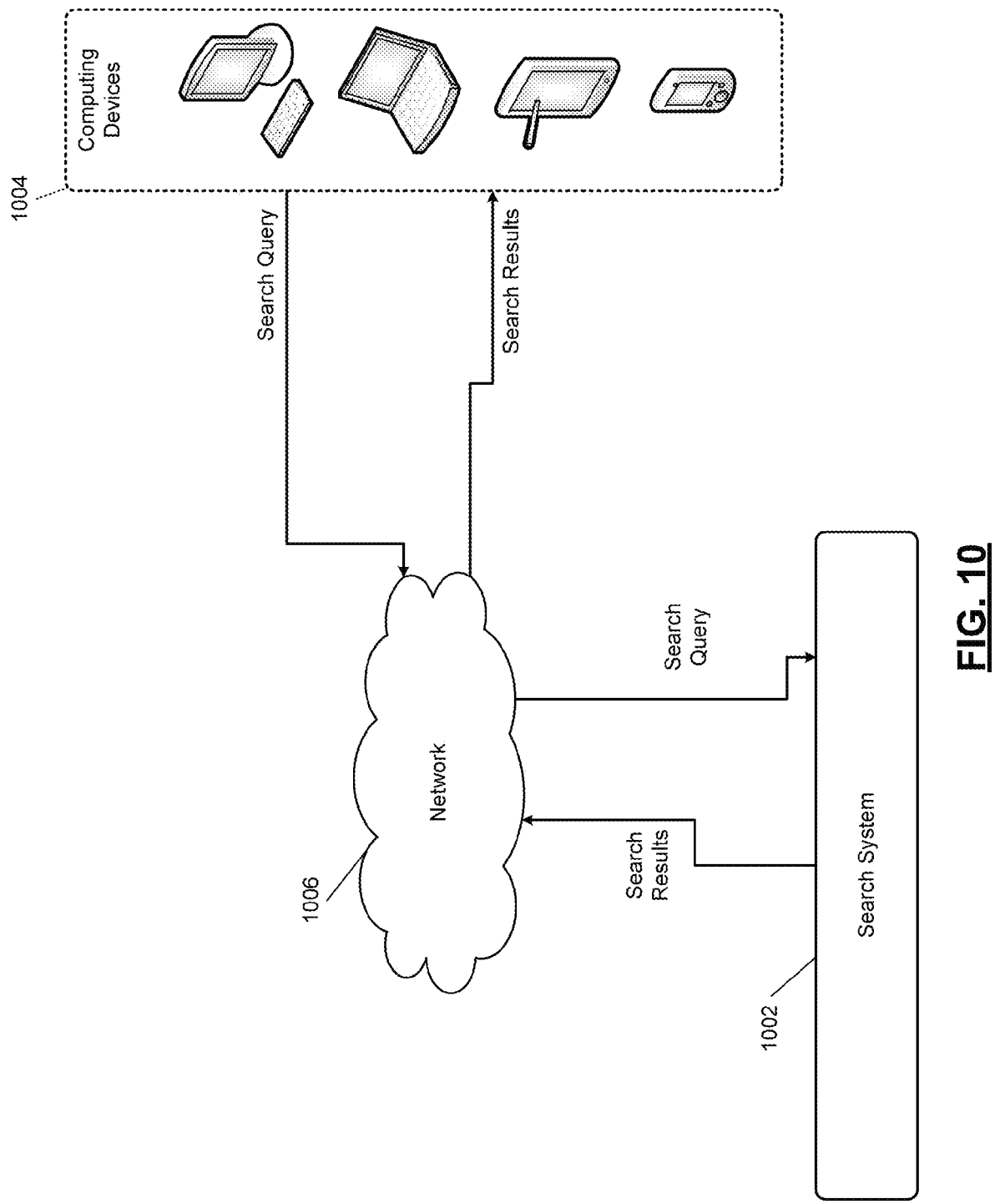
FIG. 10 is a functional block diagram of an example image retrieval system.

FIG. 10 includes a functional block diagram including a search system 1002 configured to respond to queries. The search system 1002 is configured to receive queries from one or more user computing device(s) 1004 via a network 1006. The queries may be, for example, images, such as images captured using a camera of the computing device and/or images captured in one or more other manners.

The search system 1002 performs searches for images based on the queries, respectively, to identify one or more search results using the CNN module 204 and the iterative attention module 208. The search system 1002 transmits the results back to the computing devices 1004 that transmitted the queries, respectively. For example, the search system 1002 may receive a query including an image from a computing device. The search system 1002 may provide a matching image and other information about one or more objects in the images back to the computing device.

The computing devices 1004 output the results to users. For example, the computing devices 1004 may display the results to users on one or more displays of the computing devices and/or one or more displays connected to the computing devices. Additionally or alternatively, the computing devices 1004 may audibly output the results via one or more speakers. The computing devices 1004 may also output other information to the users. For example, the computing devices 1004 may output additional information related to the results, advertisements related to the results, and/or other information. The search system 1002 and the computing devices 1004 communicate via a network 1006.

A plurality of different types of computing devices 1004 are illustrated in FIG. 10. Another example computing device is illustrated in FIG. 1. An individual user computing device may also be referred to herein as a computing device 1004. The computing devices 1004 include any type of computing devices that is configured to generate and transmit queries to the search system 1002 via the network 1006. Examples of the computing devices 1004 include, but are not limited to, smart (cellular) phones, tablet computers, laptop computers, and desktop computers, as illustrated in FIG. 10. The computing devices 1004 may also include other computing devices having other form factors, such as computing devices included in vehicles, gaming devices, televisions, consoles, or other appliances (e.g., networked refrigerators, networked thermostats, etc.).

The computing devices 1004 may use a variety of different operating systems. In an example where a computing device 1004 is a mobile device, the computing device 1004 may run an operating system including, but not limited to, Android, iOS developed by Apple Inc., or Windows Phone developed by Microsoft Corporation. In an example where a computing device 1004 is a laptop or desktop device, the computing device 1004 may run an operating system including, but not limited to, Microsoft Windows, Mac OS, or Linux. The computing devices 1004 may also access the search system 1002 while running operating systems other than those operating systems described above, whether presently available or developed in the future.

In some examples, a computing device 1004 may communicate with the search system 1002 using an application installed on the computing device 1004. In general, a computing device 1004 may communicate with the search system 1002 using any application that can transmit queries to the search system 1002 to be responded to (with results) by the search system 1002. In some examples, a computing device 1004 may run an application that is dedicated to interfacing with the search system 1002, such as an application dedicated to performing searching and providing search results. In some examples, a computing device 1004 may communicate with the search system 1002 using a more general application, such as a web-browser application. The application executed by a computing device 1004 to communicate with the search system 1002 may display a search field on a graphical user interface (GUI) in which the user may input queries.

Additional information may be provided with a query, such as text. A text query entered into a GUI on a computing device 1004 may include words, numbers, letters, punctuation marks, and/or symbols. In general, a query may be a request for information identification and retrieval from the search system 1002. For example, a query including text may be directed to providing information regarding a subject (e.g., a business, point of interest, product, etc.) of the text of the query.

A computing device 1004 may receive results from the search system 1002 that is responsive to the search query transmitted to the search system 1002. In various implementations, the computing device 104 may receive and the search system 1002 may transmit multiple results that are responsive to the search query or multiple items (e.g., entities) identified in a query. In the example of the search system 1002 providing multiple results, the search system 1002 may determine a confidence value for each of the results and provide the confidence values along with the results to the computing device 1004. The computing device 1004 may display more than one of the multiple results (e.g., all results having a confidence value that is greater than a predetermined value), only the result with the highest confidence value, the results having the N highest confidence values (where N is an integer greater than one), etc.

The computing device 1004 may be running an application including a GUI that displays the result(s) received from the search system 1002. The respective confidence value(s) may also be displayed, or the results may be displayed in order (e.g., descending) based on the confidence values. For example, the application used to transmit the query to the search system 1002 may also present (e.g., display or speak) the received search results(s) to the user via the computing device 1004. As described above, the application that presents the received result(s) to the user may be dedicated to interfacing with the search system 1002 in some examples. In other examples, the application may be a more general application, such as a web-browser application.

The GUI of the application running on the computing device 1004 may display the search result(s) to the user in a variety of different ways, depending on what information is transmitted to the computing device 1004. In examples where the results include a list of results and associated confidence values, the search system 1002 may transmit the list of results and respective confidence values to the computing device 1004. In this example, the GUI may display the result(s) and the confidence value(s) to the user as a list of possible results.

In some examples, the search system 1002, or another computing system, may transmit additional information to the computing device 1004 such as, but not limited to, applications and/or other information associated with the results, the query, points of interest associated with the results, etc. This additional information may be stored in a data store and transmitted by the search system 1002 to the computing device 1004 in some examples. In examples where the computing device 1004 receives the additional information, the GUI may display the additional information along with the result(s). In some examples, the GUI may display the results as a list ordered from the top of the screen to the bottom of the screen by descending confidence value. In some examples, the results may be displayed under the search field in which the user entered the query.

In some examples, the computing devices 1004 may communicate with the search system 1002 via another computing system. The other computing system may include a computing system of a third party using the search functionality of the search system 1002. The other computing system may belong to a company or organization other than that which operates the search system 1002. Example parties which may leverage the functionality of the search system 1002 may include, but are not limited to, internet search providers and wireless communications service providers. The computing devices 1004 may send queries to the search system 1002 via the other computing system. The computing devices 1004 may also receive results from the search system 1002 via the other computing system. The other computing system may provide a user interface to the computing devices 1004 in some examples and/or modify the user experience provided on the computing devices 1004.

The computing devices 1004 and the search system 1002 may be in communication with one another via the network 1006. The network 1006 may include various types of networks, such as a wide area network (WAN) and/or the Internet. Although the network 1006 may represent a long range network (e.g., Internet or WAN), in some implementations, the network 1006 may include a shorter range network, such as a local area network (LAN). In one embodiment, the network 1006 uses standard communications technologies and/or protocols. Thus, the network 1006 can include links using technologies such as Ethernet, Wireless Fidelity (WiFi) (e.g., 802.11), worldwide interoperability for microwave access (WiMAX), 3G, 4G, 5G, Long Term Evolution (LTE), digital subscriber line (DSL), asynchronous transfer mode (ATM), InfiniBand, PCI Express Advanced Switching, etc. Similarly, the networking protocols used on the network 1006 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 1006 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In other examples, the network 1006 can use custom and/or dedicated data communications technologies instead of, or in addition to, the ones described above.

As one example, a computing device may transmit an image to the search system 1002, such as including clothing, a home furnishing, etc. The search system 1002 may determine one or more most closely matching images and links (e.g., hyperinks) to websites selling a focus of the image. The search system 1002 may transmit the images and the links back to the computing device for consumption.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An image retrieval system, comprising:
a neural network (NN) module configured to generate local features based on an input image;
an iterative attention module configured to, via T iterations, generate an ordered set of super features in the input image based on the local features,
where T is an integer greater than 1; and
a selection module configured to select a second image from a plurality of images in an image database based on the second image having a second ordered set of super features that most closely match the ordered set of super features in the input image,
wherein the super features in the set of super features do not include redundant local features of the input image.

2. The image retrieval system of claim 1 wherein the iterative attention module is configured to:
during a first one of the T iterations, generate a third ordered set of super features in the input image further based on an ordered set of predetermined initialization super features and the local features; and
generate the ordered set of super features based on the third ordered set of super features.

3. The image retrieval system of claim 2 wherein the iterative attention module is configured to:
during a second one of the T iterations that is after the first one of the T iterations, generate a fourth ordered set of super features in the input image further based on the third ordered set of super features and the local features; and
generate the ordered set of super features based on the fourth ordered set of super features.

4. The image retrieval system of claim 1 wherein the iterative attention module is configured to:
during an N-th one of the T iterations, where N is an integer less than or equal to T, generate an N-th ordered set of super features in the input image further based on (a) an N−1th ordered set of super features for an N−1th iteration of the T iterations and (b) the local features; and
generate the ordered set of super features based on the N-th ordered set of super features.

5. The image retrieval system of claim 4 wherein the iterative attention module is configured to, during the N-th one of the T iterations:
determine a first linear projection of the local features;
determine a second linear projection of the local features;

determine a third linear projection of the N−1th ordered set of super features; and
generate the ordered set of super features in the input image based on the first, second, and third linear projections.

6. The image retrieval system of claim 5 wherein the iterative attention module is configured to:
determine a fourth linear projection based on a product of the first and third linear projections;
generate attention maps for the input image based on the fourth linear projection; and
generate the ordered set of super features in the input image based on the attention maps and the second linear projection.

7. The image retrieval system of claim 6 wherein the iterative attention module is configured to generate the attention maps for the input image by:
scaling the fourth linear projection;
applying a softmax function after the scaling; and
normalizing a result of the scaling.

8. The image retrieval system of claim 6 wherein the iterative attention module is configured to:
determine first features based on the attention maps and the second linear projection;
determine second features based on the third linear projection and the first features; and
generate the ordered set of super features in the input image based on the second features.

9. The image retrieval system of claim 8 wherein the iterative attention module includes a multi layer perceptron (MLP) module configured to generate an output based on the second features,
wherein the iterative attention module is configured to generate the ordered set of super features in the input image based on (a) the second features and (b) the output of the MLP module.

10. The image retrieval system of claim 1 wherein the iterative attention module is trained by minimizing a contrastive loss.

11. The image retrieval system of claim 1 wherein the iterative attention module is trained by minimizing a cosine similarity loss.

12. The image retrieval system of claim 1 wherein:
the NN module receives the input image from a computing device via a network; and
the selection module transmits the second image to the computing device via the network.

13. The image retrieval system of claim 12 further comprising the computing device, wherein the computing device is configured to at least one of:
display the second image on a display; and
display information regarding the second image on the display; and
audibly output the information regarding the second image via a speaker.

14. A system, comprising:
the image retrieval system of claim 1;
a camera configured to capture the input image; and
a pose and location module configured to determine at least one of:
a present location based on the second image; and
a pose of the camera based on the second image.

15. An image retrieval method, comprising:
by a neural network (NN) module, generating local features based on an input image;

via T iterations, generating an ordered set of super features in the input image based on the local features using an attention module,
where T is an integer greater than 1; and
selecting a second image from a plurality of images in an image database based on the second image having a second ordered set of super features that most closely match the ordered set of super features in the input image,
wherein the super features in the set of super features do not include redundant local features of the input image.

16. The image retrieval method of claim 15 wherein the generating the ordered set of super features includes:
during a first one of the T iterations, generating a third ordered set of super features in the input image further based on an ordered set of predetermined initialization super features and the local features; and
generating the ordered set of super features based on the third ordered set of super features.

17. The image retrieval method of claim 16 wherein the generating the ordered set of super features includes:
during a second one of the T iterations that is after the first one of the T iterations, generating a fourth ordered set of super features in the input image further based on the third ordered set of super features and the local features; and
generating the ordered set of super features based on the fourth ordered set of super features.

18. The image retrieval method of claim 15 wherein the generating the ordered set of super features includes:
during an N-th one of the T iterations, where N is an integer less than or equal to T, generating an N-th ordered set of super features in the input image further based on (a) an N−1th ordered set of super features for an N−1th iteration of the T iterations and (b) the local features; and
generating the ordered set of super features based on the N-th ordered set of super features.

19. The image retrieval method of claim 18 wherein the generating the ordered set of super features includes, during the N-th one of the T iterations:
determining a first linear projection of the local features;
determining a second linear projection of the local features;
determining a third linear projection of the N−1th ordered set of super features; and
generating the ordered set of super features in the input image based on the first, second, and third linear projections.

20. The image retrieval method of claim 19 wherein the generating the ordered set of super features includes:
determining a fourth linear projection based on a product of the first and third linear projections;
generating attention maps for the input image based on the fourth linear projection; and
generating the ordered set of super features in the input image based on the attention maps and the second linear projection.

21. The image retrieval method of claim 20 wherein generating the attention maps includes generating the attention maps for the input image by:
scaling the fourth linear projection;
applying a softmax function after the scaling; and
normalizing a result of the scaling.

22. The image retrieval method of claim 20 wherein the generating the ordered set of super features includes:
determining first features based on the attention maps and the second linear projection;
determining second features based on the third linear projection and the first features; and
generating the ordered set of super features in the input image based on the second features.

23. The image retrieval method of claim 22 further comprising generating an output based on the second features using a multi layer perceptron (MLP) module,
wherein the generating the ordered set of super features includes generating the ordered set of super features in the input image based on (a) the second features and (b) the output of the MLP module.

24. The image retrieval method of claim 15 wherein the attention module is trained by minimizing a contrastive loss.

25. The image retrieval method of claim 15 wherein the attention module is trained by minimizing a cosine similarity loss.

26. The image retrieval method of claim 15 further comprising:
receiving the input image from a computing device via a network; and
transmitting the second image to the computing device via the network.

27. The image retrieval method of claim 26 further comprising, by the computing device, at least one of:
displaying the second image on a display; and
displaying information regarding the second image on the display; and
audibly outputting the information regarding the second image via a speaker.

28. A method, comprising:
the image retrieval method of claim 15;
capturing the input image using a camera; and
determining at least one of:
a present location based on the second image; and
a pose of the camera based on the second image.

* * * * *